US009454781B2

(12) United States Patent
Badenes et al.

(10) Patent No.: US 9,454,781 B2
(45) Date of Patent: Sep. 27, 2016

(54) RANKING AND RECOMMENDATION OF ONLINE CONTENT

(71) Applicant: International Business Machines Corporation, Armonk, NY (US)

(72) Inventors: Hernan Badenes, Neuquen (AR); Tara L. Matthews, San Jose, CA (US); Barton A. Smith, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 13/953,386

(22) Filed: Jul. 29, 2013

(65) Prior Publication Data

US 2015/0032737 A1 Jan. 29, 2015

(51) Int. Cl.
*G06F 17/30* (2006.01)
*G06Q 30/06* (2012.01)
*G06Q 50/00* (2012.01)

(52) U.S. Cl.
CPC ........... *G06Q 30/0631* (2013.01); *G06F 17/30* (2013.01); *G06Q 50/01* (2013.01)

(58) Field of Classification Search
CPC .................. G06F 17/30867; G06F 17/30905; G06F 17/30749; G06F 17/30761; G06Q 30/0631; G06Q 50/01
USPC .................. 707/E17.109, 748, E17.005, 723
See application file for complete search history.

(56) References Cited

U.S. PATENT DOCUMENTS

| | | | |
|---|---|---|---|
| 7,599,938 B1 | 10/2009 | Harrison, Jr. | |
| 7,840,563 B2 | 11/2010 | Powers et al. | |
| 8,352,464 B2 | 1/2013 | Fotev | |
| 8,484,224 B1* | 7/2013 | Harris et al. | 707/748 |
| 2007/0174872 A1* | 7/2007 | Jing et al. | 725/46 |
| 2010/0306194 A1* | 12/2010 | Evans | 707/733 |
| 2011/0022578 A1* | 1/2011 | Fotev | 707/706 |

(Continued)

FOREIGN PATENT DOCUMENTS

WO 2010001406 1/2010

OTHER PUBLICATIONS

Weimer, et al., "Automatically Assessing the Post Quality in Online Discussions on Software" Proceedings of the ACL 2007 Demo and Poster Sessions, pp. 125-128, Prague, Jun. 2007. 2007 Association for Computational Linguistics.

(Continued)

*Primary Examiner* — Robert Beausoliel, Jr.
*Assistant Examiner* — Pedro J Santos
(74) *Attorney, Agent, or Firm* — Erik Huestis; Stephen Kenny; Foley Hoag LLP

(57) ABSTRACT

Ranking and recommendation of online content including social media, blog and forum posts is provided. A method of and computer program product for content analysis are provided. A subset of content items is selected from a set of content items. Each content item in the set has at least one attribute. For each content item in the subset, a user is queried to obtain a subjective value. A formula is derived that relates the at least one attribute of each content item of the subset to the subjective value of each content item of the subset. The formula is applied to each content item of the set to determine a calculated value of each content item of the set. A ranking of the set of content items is determined based on the calculated value of each content item. Recommendations are provided to a user based on the ranking.

14 Claims, 2 Drawing Sheets

(56) References Cited

U.S. PATENT DOCUMENTS

2011/0060703 A1* 3/2011 Alaniz .............. G06K 9/00496
                                                    706/12
2013/0179252 A1* 7/2013 Dong et al. ............... 705/14.43

OTHER PUBLICATIONS

Wanas, et al. "Automatic Scoring of Online Discussion Posts" Cairo Microsoft Innovation Center, http://www.slashdot.org.

* cited by examiner

RANKING AND RECOMMENDATION OF ONLINE CONTENT

BACKGROUND

Embodiments of the present invention relate to analysis of online content, and more specifically, to ranking and recommendation of online content including social media, blog and forum posts.

BRIEF SUMMARY

According to one embodiment of the present invention, a method of and computer program product for content analysis are provided. A subset of content items is selected from a set of content items. Each content item in the set has at least one attribute. For each content item in the subset, a user is queried to obtain a subjective value. A formula is derived that relates the at least one attribute of each content item of the subset to the subjective value of each content item of the subset. The formula is applied to each content item of the set to determine a calculated value of each content item of the set. A ranking of the set of content items is determined based on the calculated value of each content item. Recommendations are provided to a user based on the ranking.

DETAILED DESCRIPTION

A variety of online communities are available that enable members to contribute content. These include forums, file sharing services, collaboratively edited pages such as wikis, and various social media outlets. Each of these comprises software enables users to share content to be consumed by other users. As such communities grow, and the volume of contributed content expands, viewing the content in an organized fashion becomes challenging. In order to allow a user to view a relevant subset of a large body of content, the content may be ranked. Ranking of content allows content to be sorted by its importance to a user and allows presentation of recommendations to the user as to content that is likely to be of interest. In addition, ranking enables a community owner or administrator to determine the most relevant topics in a discussion or the individual content items that are more relevant to the community.

To provide a more accessible presentation of content to users, high value content may be highlighted for special presentation or analysis. Content analysis may be used to determine the value of the contributions of individual authors. The value of a given content item or author may be used to provide content recommendations. For example, individual items may be ranked as "important" or "high value" in order to suggest items for a user to consume. Rankings may depend on the particular criterion evaluated and may vary from user to user. For example, the same item of content may have a different relevance value to several users depending on their interests, jobs, and other circumstances.

Various methods may be used to provide content recommendations. Content-based analysis may compare new content to those items of content previously consumed by a user. In such an approach, similar content is assumed to have similar value. User feedback may also be used to perform content recommendation. For example, in a community where users may provide feedback by indicating approval of an item of content, a recommendation may be based on the similarity of a new item to a previously approved item. A content-based approach may also assign a quality metric to an item of content, based on natural language processing techniques that identify different dimensions such as originality, referencing and links, formatting, and spelling.

In a collaborative filtering approach, a given user is compared to other users in the community. In such an approach, similar users are assumed to value content similarly. Thus, prior behavior of other users is used to predict a current user's behavior. Collaborative filtering approaches may be applied in online shopping environments, where potential purchases are recommended to a buyer based on the user's similarity to other users and those other user's browsing and purchase history.

Figure 1:
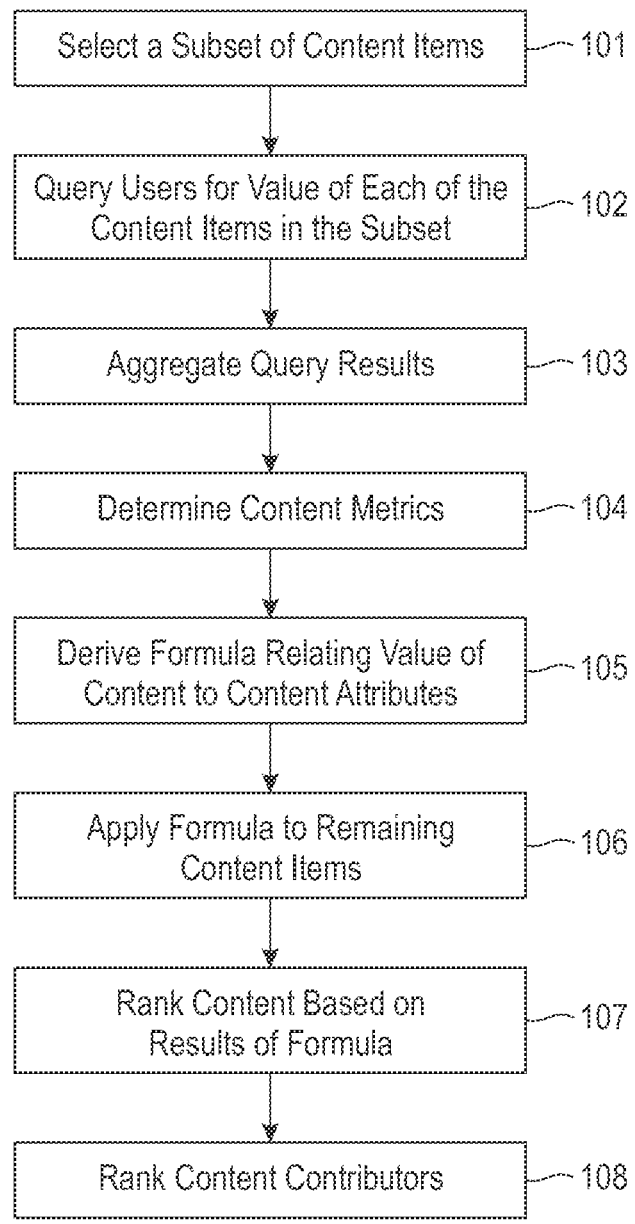
FIG. 1 depicts a method of valuing user contributed content according to an embodiment of the present invention.

Turning now to FIG. 1, an exemplary method in accordance with the present disclosure is depicted. In an online community with user contributed content, a subset of items is selected 101. Users of the community are queried 102 as to the value of each of the items in the subset. In some embodiments, users are queried through a voting mechanism, in which they are asked to vote for the best n content items. In other embodiments, the user is asked to assign a numeric or descriptive value to the individual content item with regard to a given criterion (e.g., relevance, usefulness, quality). In yet other embodiments, the user is asked to indicate simply whether the post was helpful or unhelpful, liked or disliked, or some other binary classifier.

The content items evaluated by the user may vary based on the type of online community and the type of content contributed. For example, where the online community is a forum or bulletin board, the content items may include posts, threads, or uploaded content. Where the online community is a file sharing service, content items may include files. Where the online community is a photo-sharing site, the content items may include digital images. Where the online community is a news aggregator, the content items may include news items. Where the online community provides a collaboratively edited environment such as a wiki, the content items may include individual edits or contributions. Where the online community is a social networking service, content items may include posts or connection invitations. In addition to the exemplary content items described above, the subject matter of the present disclosure is applicable to arbitrary content items contributed to online communities.

In some embodiments, users are regularly asked to vote on the value that a post represents to them with respect to a particular criterion. Criteria may include relevance of a post to the user's work. The number of users voting may vary. However, the larger the number of users, the more accurate the resulting statistical model is. In addition, the number of users and the number of posts is chosen so that multiple votes are obtained for each post. The results of the user query are aggregated 103.

Implicit metrics are collected for the posts on which users have voted 104. Metrics may include intrinsic attributes of the content such as age, size, topics and keywords. Metrics may also include attributes indirectly affected by user behavior such as a number of recommendations received, a number of comments made in reply to a post, and a number of times the element was shared to other communities or feeds.

The aggregated data is used to derive a formula 105 that correlates metrics of the queried content items with the results of the user queries. The formula assigns a numerical score to each item of content based on its implicit metrics. In some embodiments, the formula may be created manually by a community administrator. In other embodiments, the formula is created automatically, for example by a software module. In some embodiments, the formula is determined by performing a correlation analysis to find statistically significant correlations between the implicit metrics and the results of user voting. In some embodiments, the formula is determined through regression analysis to find coefficients for estimation of the user vote scores from the implicit metrics. In some embodiments, a classifier is determined to correlate metrics of the queried content items with the results of the user queries. In some embodiments, the classifier is derived through the application of machine learning.

Once the formula has been determined, it is applied to all content items in the community 106 to assign a numeric value to those items. The formula may also be applied to any new content contributed to the community. In this manner, explicit user feedback in the form of votes and surveys is combined with content metrics and attributes such as number of views, number of comments, and keywords. The result is a statistically valid model of the value of content to users.

The value assigned to each item of content may then be used to rank content 107. Rankings may vary based on the questions asked to users, and may implement ratings for questions like "How valuable is this content to your work." The rankings may be used to sort content from most valuable to least valuable with respect to the criterion being measured to generate a visual output, which may be an ordered list. This ranking may also be directly used to provide content recommendations, wherein items of content with a high value score with respect to a given criterion are recommended.

Using the content values described above, the authors of content may also be ranked. An aggregated formula may be determined to score authors rather than posts based on the metrics and attributes of the content that they have contributed to the community. The resulting author rankings may allow identification of the top experts in a community based on who is contributing the most value over a given period of time. In one embodiment, authors are ranked by totaling the value of each of their posts.

In some embodiments, individual items of content are organized into topics. For example, users may associate with keywords or tags with individual items of content. In addition, topics may be assigned automatically by analysis of the text of an item of content, for example by recognizing keywords. By aggregating the values of posts within a topic, a topic value may be determined. This value may in turn be used to rank topics within the community.

Examples of communities to which the subject matter of the present disclosure may be applied include: wiki pages that are collaboratively authored and that receive recommendations; forum topics that generate discussions in form of public messages and replies; Blogs that may also be recommended and receive comments by other users; and files that a user uploads to share and that may be downloaded by others and receive recommendations.

In some embodiments, a survey is run over a representative sample of community entries to obtain a rating on them. A formula such as the below is derived by adjusting the constants to obtain the highest possible correlation to user-assigned ratings.

$$\text{value}(x)=0.7\ \log(V(x)+1)+0.2\ \log(R(x)+1)+0.1\ \log(C(x)+1) \quad \text{Equation 1}$$

V, R and F are each functions that return the number of views, recommendations and comments received by a post, x, respectively.

In some embodiments, visual output is generated based on the results of the value formula. Visual output may include a chart displaying the number of high value, medium value, and low value posts over time. In some embodiments, high value posts are those with the top 20% of scores.

In some embodiments, an aggregate formula is applied to assign a contributor value to each contributor of content. For example, the value formula given in Equation 1 may be aggregated as shown below in Equation 2, for each content item x contributed by author a. In other embodiments, the values of each of the contributed items may be averaged for a given contributor.

$$\text{value}(a)=0.8\ \log(\Sigma_x V(x)+1)+0.8\ \log(\Sigma_x R(x)+1)+0.8\ \log(\Sigma_x C(x)+1) \quad \text{Equation 2}$$

An existing online community may be modified to include a software module operable to apply ranking and recommendation according to the present disclosure. For example, a software module may be installed accesses a database of the online community either directly or through a community specific API to read content items and contributor information. The software module may interact with the existing user interface of the online community to present queries to users of the online community. For example, supplemental user interface elements may be provided to query a user upon login or upon viewing a content item. In some embodiments, the supplemental user interface elements may request a numeric value from the user, whether by direct entry or by selection of representative objects such as stars. In some embodiments, the supplemental user interface elements may be presented in a popup, a dialog box, or inline in a web page.

Figure 2:
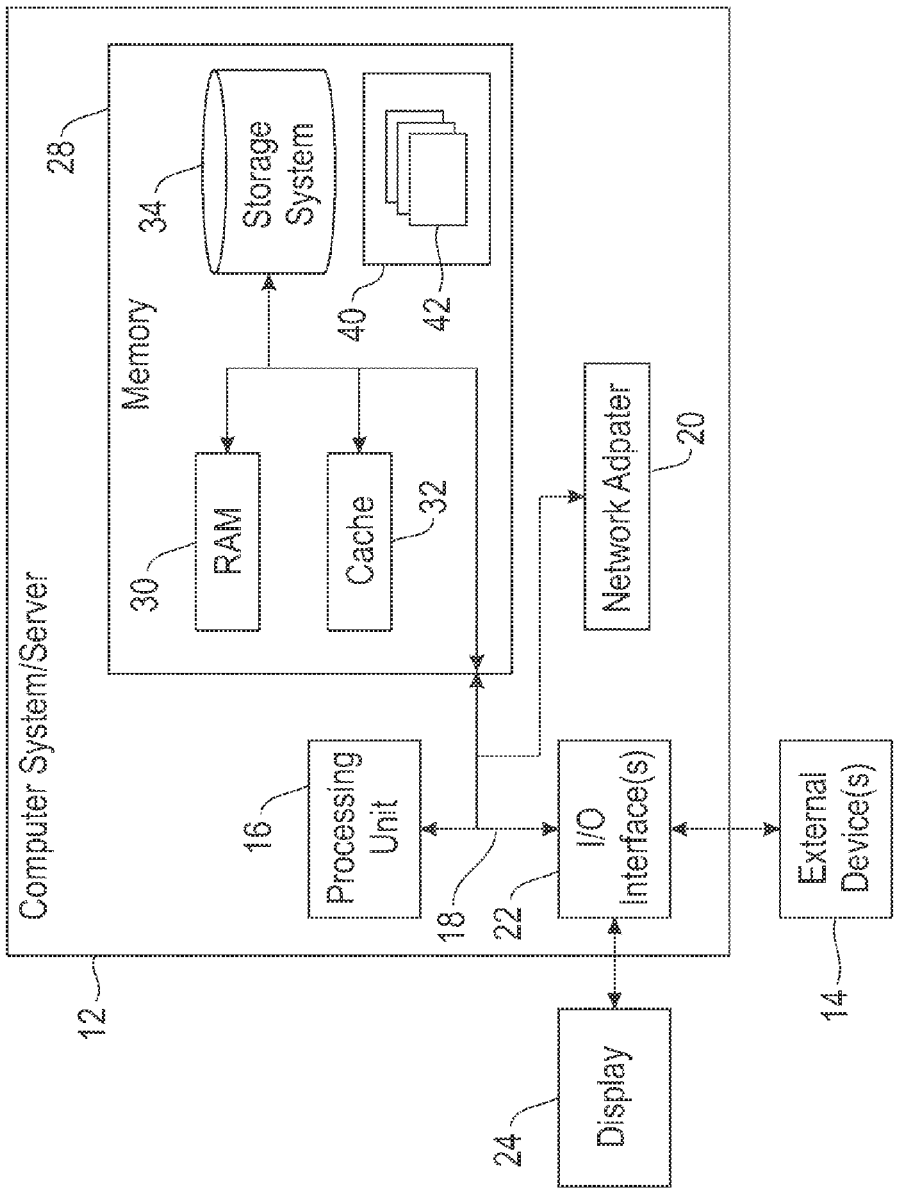
FIG. 2 depicts a computing node according to an embodiment of the present invention.

Referring now to FIG. 2, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 2, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   selecting a subset of content items from a set of content items, each content item of the set having at least one attribute;
   for each content item of the subset, querying a user to obtain a numeric subjective value;
   deriving an equation, the equation relating the at least one attribute of each content item of the subset to the subjective value of each content item of the subset, the equation being derived by regression analysis to find coefficients for estimation of the subjective value of each content item from the at least one attribute of each content item or by correlation analysis to find statistically significant correlations between the at least one attribute of each content item and the subjective value of each content item;
   applying the equation to each content item of the set to determine a numeric calculated value of each content item of the set, the equation having at least one attribute of each content item of the set as input and the calculated value of each content item of the set as output;
   determining a ranking of the set of content items based on the calculated value of each content item; and
   providing recommendations to a user based on the ranking.

2. The method of claim 1, the method further comprising:
   selecting a contributor subset of the set of content items, the contributor subset consisting of those content items of the set having a common contributor; and
   aggregating the calculated values of the content items of the contributor subset to determine a contributor value.

3. The method of claim 1, further comprising:
   sorting the content items of the set based on the ranking of the set of content items to generate an ordered list.

4. The method of claim 1, wherein the attribute is selected from the group consisting of: age, size, topic and presence of keywords.

5. The method of claim 1, wherein the attribute is selected from the group consisting of: a number of recommendations received, a number of comments made in reply, a number of times viewed, and a number of times shared.

6. A computer program product for content analysis, the computer program product comprising a computer readable storage medium having program code embodied therewith, the program code executable by a processor to:
   select a subset of content items from a set of content items, each content item of the set having at least one attribute;
   for each content item of the subset, query a user to obtain a numeric subjective value;
   derive an equation, the equation relating the at least one attribute of each content item of the subset to the subjective value of each content item of the subset, the equation being derived by regression analysis to find coefficients for estimation of the subjective value of each content item from the at least one attribute of each content item or by correlation analysis to find statistically significant correlations between the at least one attribute of each content item and the subjective value of each content item;

apply the equation to each content item of the set to determine a numeric calculated value of each content item of the set, the equation having at least one attribute of each content item of the set as input and the calculated value of each content item of the set as output;

determine a ranking of the set of content items based on the calculated value of each content item; and provide recommendations to a user based on the ranking.

7. The computer program product of claim 6, the program code further executable to:

select a contributor subset of the set of content items, the contributor subset consisting of those content items of the set having a common contributor;

aggregate the calculated values of the content items of the contributor subset to determine a contributor value.

8. The computer program product of claim 6, the program code further executable to:

sort the content items of the set based on the ranking of the set of content items to generate an ordered list.

9. The computer program product of claim 6, wherein the attribute is selected from the group consisting of: age, size, topic and presence of keywords.

10. The computer program product of claim 6, wherein the attribute is selected from the group consisting of: a number of recommendations received, a number of comments made in reply, a number of times viewed, and a number of times shared.

11. The method of claim 1, wherein the attribute is intrinsic to the content item.

12. The computer program product of claim 6, wherein the attribute is intrinsic to the content item.

13. The method of claim 1, wherein the subjective value comprises a rating.

14. The computer program product of claim 6, wherein the subjective value comprises a rating.

* * * * *